United States Patent Office 3,172,811
Patented Mar. 9, 1965

3,172,811
1 - METHYL - 3 - CARBOXY - 6,7 - DIMETHOXY-4 - (1H) - QUINOLONE PROTEUS INFECTION TREATMENT
Daniel Kaminsky, East Paterson, and Robert I. Meltzer, Rockaway, N.J., assignors to Warner-Lambert Pharmaceutical Company, Morris Plains, N.J., a corporation of Delaware
No Drawing. Filed Oct. 16, 1962, Ser. No. 231,024
1 Claim. (Cl. 167—65)

This invention relates to therapeutic compositions useful in the treatment of bacterial infections. More particularly, it relates to compositions useful against Proteus infections and to a method for the treatment of such infections.

The Proteus group of bacteria consists of pleomorphic gram negative bacilli which can cause infections, for example, of the genito-urinary system, the gastro-intestinal tract and otitis media. Some of its members such as *P. vulgaris* possess flagella and are extremely motile. Because of its extreme motility and its ability to develop drug resistance there are few chemotherapeutic compositions which can be used to treat Proteus infections, especially when the Proteus invades the urinary tract.

The administration of known agents such as the sulfonamides is of limited value in the treatment of infections caused by *Proteus vulgaris*. While streptomycin has proven to be useful in some cases there organisms readily become resistant to it. Again, chloramphenicol is effective but only in certain cases.

With this in mind there have been attempts to find therapeutic agents which would be effective in the treatment of Proteus infections. Thus, materials such as 2-carboxy-1-methyl-4-(1H)-quinolone, 3-ethoxycarbonyl-6,7-dimethoxy-1-methyl-4-(1H)-quinolone, 3-carboxy - 1 - methyl-4- (1H)-quinolone, 3-(3-dimethylaminopropylcarbamoyl)-1-methyl-4-(1H)-quinolone, 3 - (3 - dimethylaminopropylcarbamoyl)-6,7-dimethoxy-1-methyl - 4 - (1H)-quinolone have been tested for this purpose but they have not proven to be satisfactory.

We have now found, surprisingly enough, that the compound 1-methyl-3-carboxy-6,7-dimethoxy-4-(1H)-quinolone of the formula:

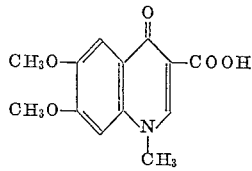

and its salts are remarkably effective therapeutic agents in the treatment of Proteus infections in an infected host.

In accordance with our invention this compound is conveniently employed in the form of a therapeutic composition comprising as active ingredient 1-methyl-3-carboxy-6,7-dimethoxy-4-(1H)-quinolone in the form of the free base or in the form of one of its salts employing an inert pharmaceutical carrier in the formulation of said therapeutic compositions. These compositions containing 1 to 5% by weight of 1-methyl-3-carboxy-6,7-dimethoxy-4-(1H)-quinolone are useful topically against Proteus infection. The compositions for topical use are formulated with standard pharmaceutical diluents such as the commonly used ointment or dusting powder bases. They include, for example, talc, starch, petroleum jelly and the like. The active ingredient may also be formulated into water immiscible ointment bases such as polyethylene glycol ointment U.S.P.

Suitable solid oral compositions, for example, comprise the stated active ingredient from 250 to 500 mg. and such pharmaceutical excipients such as lactose, starch and powdered sugar as are commonly used in the manufacture of tablets, pills, capsules and the like.

As suitable compositions for oral liquid formulations there may be mentioned, for example, syrups, solutions, suspensions and the like, containing 50 to 100 mg. of the stated active ingredient per ml.

The injectable solutions or suspensions comprise, for example, the active stated ingredient dissolved in a pyrogen free, sterile isotonic solution or suspended in an inert oil such as sesame oil.

The active ingredient 1-methyl-3-carboxy-6,7-dimethoxy-4-(1H)-quinolone, for example, is prepared by hydrolyzing 1-methyl-3-carboethoxy-6,7-dimethoxy-4-(1H)-quinolone, preferably in an alkali media. The latter is prepared, for example, by methylating 6.2 parts 3-carboethoxy-6,7-dimethoxy-4-quinolinol with 4.2 parts dimethyl sulfate at an alkaline pH. The 3-carboethoxy-6,7-dimethoxy-4-quinolinol may be prepared, for example, by reacting 3,4-dimethoxy aniline with diethyl ethoxymethylene malonate in accordance with the disclosure of Byran Riegel et al., J.A.C.S., vol. 68, page 1264, 1946.

The invention is illustrated but not limited by the following examples in which the parts are by weight.

*Example I*

To 4.2 parts dimethyl sulfate is added in three portions over a two hour period a mixture of 6 parts 3-carboethoxy-6,7-dimethoxy-4-quinolinol and 4.2 parts potassium hydroxide in 50 parts of water. The resulting mixture is stirred for 16 to 24 hours at 20°–25° C. after which it is filtered to give 1-methyl-3-carboethoxy-6,7-dimethoxy-4-(1H)-quinolone in the form of a grey-brown solid melting at 194°–202° C. The recrystallized form from acetonitrile melts at 214°–216° C.

*Example II*

15 parts of 1-methyl-3-carboethoxy-6,7-dimethoxy-4-(1H)-quinolone and 5 parts of sodium hydroxide are dissolved in a mixture of 100 parts of water and 100 parts of ethanol. The mixture is then refluxed for four hours. While the mixture is still hot it is treated with decolorizing charcoal and filtered. The filtrate is then acidified to yield 1-methyl-3-carboxy-6,7-dimethoxy - 4-(1H)-quinolone in the form of an off-white solid melting at 279°–283° C. Further treatment with alkali and decolorizing charcoal gives a colorless solid melting at 284°–287° C.

*Example III*

A mixture of 100 parts of 1-methyl-3-carboxy-6,7-dimethoxy-4-(1H)-quinolone and 150 parts of terra alba is granulated with a 10% gelatin solution. The granules are then dried at 100°–110° F. The dried granules are then passed through a 16 mesh screen, 1.5 parts magnesium stearate are added thereto and the mixture is compressed into 750 mg. tablets.

*Example IV*

100 parts of 1-methyl-3-carboxy-6,7-dimethoxy-4-(1H)-quinolone are mixed with 200 parts of milk sugar. The mixture is thoroughly mixed and filled into hard gelatin capsules containing 600 mg. of this mixture per capsule.

*Example V*

10 parts of sterile 1-methyl-3-carboxy-6,7-dimethyl-4-(1H)-quinolone is suspended in 200 parts of sterile sesame oil. The resulting suspension is suitable for intramuscular injection.

It is understood that the foregoing detailed description is given merely by way of illustration and that many variations may be made therein without departing from the spirit of our invention.

Having described our invention, what we desire to secure by Letters Patent is:

A method for the treatment of Proteus infection which comprises administering to infected hosts an effective dose of 1-methyl-3-carboxy-6,7-dimethoxy-4-(1H)-quinolone.

References Cited in the file of this patent

Riegel et al.: "The Synthesis of Some 4-Quinolinols and 4-Chloro-Qinolines by the Ethoxymethylene Malonic Ester Method," J. Am. Chem. Soc. 68, pp. 1264–6, July 1946.

Salzer et al.: "A New Type of Compounds Active Against Avian Malaria," Chem. Ber. 81, pp. 12–19 (1948); abstracted in English in Chem. Abstracts 43:1415c–1417e (1949).

Box et al.: "Standardization of a Curative Test With *Plasmodium berghei* in white mice," Jour. Infect. Dis., 94 (1), pp. 78–83 (1954).